US006971574B1

(12) United States Patent
Herskowitz

(10) Patent No.: US 6,971,574 B1
(45) Date of Patent: Dec. 6, 2005

(54) METHOD OF ACCURATELY VERIFYING ELECTION RESULTS WITHOUT THE NEED FOR A RECOUNT

(76) Inventor: Irving L. Herskowitz, 815 Main St., Somers, CT (US) 06071

( * ) Notice: Subject to any disclaimer, the term of this patent is extended or adjusted under 35 U.S.C. 154(b) by 0 days.

(21) Appl. No.: 10/850,204

(22) Filed: May 20, 2004

(51) Int. Cl.[7] .............................................. G06F 17/60

(52) U.S. Cl. ...................................... 235/386; 235/383

(58) Field of Search ...................... 235/462.01–462.45, 235/454, 487, 488, 54 F, 54 R, 386, 375, 235/380, 383; 707/1; 283/5

(56) References Cited

U.S. PATENT DOCUMENTS 3,677,462 A * 7/1972 Moldovan, Jr. ........... 235/54 R
3,818,444 A * 6/1974 Connell ................. 235/462.39
3,858,031 A * 12/1974 Kornfeld ............... 235/462.14
4,021,780 A * 5/1977 Narey et al. .............. 235/54 F
4,142,095 A * 2/1979 Cason et al. .............. 235/54 F
5,256,864 A * 10/1993 Rando et al. .......... 235/462.14
5,491,328 A * 2/1996 Rando ................... 235/462.14
2002/0091673 A1 * 7/2002 Seibel et al. ................... 707/1
2003/0042731 A1 * 3/2003 Li ................................ 283/5
2004/0046021 A1 * 3/2004 Chung ........................ 235/386
2004/0140357 A1 * 7/2004 Cummings ................. 235/386

* cited by examiner

*Primary Examiner*—Thien M. Le
(74) *Attorney, Agent, or Firm*—Robert Nathans

(57) ABSTRACT

Hash numbers are assigned to each individual ballot choice made by a particular voter and a hash total, establishing the voter's set of ballot choices, is recorded and a printed receipt is issued to the voter, bearing the voter's identification number, to assure him that his vote was correctly recorded along with his hash total. If the voter presents his receipt, to deny that he voted as shown on the receipt, an unfavorable comparison of the previously recorded hash total, with the hash total on the receipt, proves that the receipt was forged, and each such tampering attempt and voter ID is recorded. Recounts are unnecessary, unless the number of such recorded attempts at tampering exceed a predetermined number. A hacker attempt to change a recorded vote will fail because the hash totals of the altered ballot won't match the correct hash total because the hash encoding algorithm is secret.

20 Claims, 10 Drawing Sheets

VOTER RECEIPT

VIN: XXXXXXX

PRECINCT NUMBER XX BOSTON, MA NOV 11, 2011

| FOR THE POSITION OF: | YOU VOTED FOR: |
| --- | --- |
| MAYOR | XXX X. XXXXXXX |
| CITY CLERK | XXXXXXX X. XXXXXXXXXX |
| TREASURER | X.X. XXXXXXX |

IN THE MATTER OF:

| | |
| --- | --- |
| Question Number 1 | XX |
| Question Number 2 | XXX |

XXXXXXXXXX XXX

Figure 6

ELECTION REPORT

Precinct Number XX  Boston, MA  November 11, 2011

| Candidate VIN Number | Smith | Jones | Brown | White | Black | Question #1 |
|---|---|---|---|---|---|---|
| 1234567 | X | | X | | | Yes |
| 2345678 | | X | X | | | No |
| 3456789 | X | | | X | | Yes |
| PAGE TOTALS | XX | XX | XX | XX | XX | XX - YES<br>XX- NO |

Figure 7

ELECTION REPORT – PAGE SUMMARY

| **Precinct Number XX** | | | **Boston, MA** | | | **November 11, 2011** | |
|---|---|---|---|---|---|---|---|
| **Candidate** | **Smith** | **Jones** | **Brown** | **White** | **Black** | **Question #1** | |
| **Page Number** | ------- | ------ | ------- | ------- | ------ | **YES** | **NO** |
| 1 | XX | XX | XX | XX | XX | XX | XX |
| 2 | XX | XX | XX | XX | XX | XX | XX |
| 3 | XX | XX | XX | XX | XX | XX | XX |
| 4 | XX | XX | XX | XX | XX | XX | XX |
| GRAND TOTAL | XX | XX | XX | XX | XX | XX | XX |

Figure 8

ELECTION ERROR REPORT

PRECINCT NUMBER XX BOSTON, MA NOV 11, 2011

Votes for the following were recorded during times when Polls were closed:

| VIN NUMBER | TIME AND DATE VOTE WAS RECORDED |
|---|---|
| XXXXXXX | 8:38 pm - Nov 10, 2011 |

Or

None reported.

Figure 9

ELECTION ERROR REPORT

PRECINCT NUMBER XX BOSTON, MA NOV 11, 2011

Votes for the following had discrepancies in their hash totals:

| VIN NUMBER | INITIAL HASH TOTAL | CURRENT HASH TOTAL |
|---|---|---|
| XXXXXXX | XXXXXXXXXXX | XXXXXXXXXXX |

Or

None reported.

Figure 10

METHOD OF ACCURATELY VERIFYING ELECTION RESULTS WITHOUT THE NEED FOR A RECOUNT

BACKGROUND OF THE INVENTION

The present invention relates to the field of computerized electronic voting systems.

An urgent need exists for a reliable computerized voting system that is free from various attacks that compromise the integrity of the voting process. There as been substantial publicity in the media recently of the need for a paper trail to protect against improper manipulation of the results of the voting process. However, such a verifiable paper trail can be beneficial only when a recount is held, which is costly, chaotic and time consuming nuisance. One danger is that hackers can make changes in the voting results that are not too flagrant, while keeping the altered results within the range of credibility.

Accordingly, what is desired is a computerized voting system that provides the widely desired paper trail with voter receipts to satisfy voters, and which additionally, can identify and indicate each and every improper attempted alteration of voter results, even if they are of modest proportion, and eliminate their effect on the tabulation of the vote. As a result, detection of these attempted alteration entries in error reports, should eliminate the need for the aforesaid undesirable recount process, as the specific fraudulent vote attempts would be recorded and discarded in support of the integrity of the voting system.

Besides providing a system producing a printed audit trail listing all genuine votes placed on each machine, it is also desirable to provide each voter with an identification number on a voter receipt that protects confidentiality of his vote, and yet enables him to view his vote for his peace of mind, and which is configured to eliminate his possible false assertions that his vote was altered. In this regard, it should be extremely difficult to forge such voter receipts in an attempt to unlawfully change a vote.

SUMMARY OF PREFERRED EMBODIMENTS OF THE INVENTION

The needs set forth above can be met in accordance with the present invention, whereby confidential hash values, established before the voting process begins at the polls, are assigned to each candidate (and each ballot question) selected by all voters. The hash values corresponding to the selections made by a particular voter are totaled to produce a particular total hash value for that particular voter, that is a function of and that indicates the voter's set of selections. The total hash value is modified by an encrypting random number (e.g. by multiplying the total hash value by the random number) to produce an encrypted hash total (EHT) that is recorded in the data processor memory along with the voter's choices, and such data is additionally printed on a voter receipt that is made available to the voter by, for example, a printer at the polls or over the internet. The program also produces a generated voter identification number (VIN), having a random number component for voter privacy, that is stored along with his EHT in the data processor and is also printed on the voter receipt along with the EHT. The voter can then use his VIN to address the voting precinct data processor to retrieve his voting data and verify this his vote was not cast aside through fraudulent action, and furthermore that his vote was correctly recorded and not altered, as will be the usual situation.

However, an individual voter or a group of voters could get together and falsely assert that their votes were fraudulently changed, and protest to the Election Administrator. This could even result from an organized attack on the election process by distributing false receipts to many people and have such people, that don't like the voting results, complain. For each such voter receipt, the administrator would scan the VIN on the voter receipt to access the allegedly recorded vote (if the VIN were a valid one enabling access in the first place) in the data processor and the computer program would compare the recorded EHT with the EHT on the receipt. If they match, this indicates that the voter's receipt is correct and the voter's assertion that his vote was altered is thus false. If the EHTs don't match, this is strong evidence that the offered receipt having a simulated printed EHT on the receipt is a forgery, since it does not bear the correct EHT for the choices printed on the receipt. The invention makes it extremely difficult, if not virtually impossible, for a forger to determine the "correct" required EHT for the fraudulent set of choices printed on a forged receipt. This is because the assigned hash values partially making up the EHT are secret and the secret random number that modifies the hash total is also secret. In other words, such a voter would not know how to amend the EHT to correspond to the fraudulent changes voting choices and the receipt would be easily identified as counterfeit. Additionally, this aspect of the invention should defeat a hacker because he will have extreme difficulty in penetrating the data processor to access votes and changing them, while supplying for recordation the "correct" required EHT for the changed vote.

Optional verification re-computation of the EHTs of already recorded votes cause such recomputed EHTs to be compared with the correct EHTs for the recorded votes to verify authenticity. Sets of such votes with invalid, incorrect EHTs would be entered to an invalid EHT report and discarded. This verification process is preferably performed after the polls close, but could be performed from time to time during voting hours.

Also, any entry regardless of invalid EHT verification entries, of an after hours vote (time stamped electronically) would be entered into an invalid after hours time-of-vote report and also discarded. As a result, both of these types of reports, containing invalid vote entries, would usually eliminate the need for a recount, even when such deceptive practices are detected, as the exact number of fraudulent vote attempts are recorded in the reports and discarded.

Another feature of the invention is the ability to trace an individual vote to the totals reported by the precinct or voting authority. When a voter looks at his vote in the listing, each page has page totals at the bottom and the page totals are summarized at the end of the report. Therefore, the voter can easily ascertain that his vote was included in the totals reported by his precinct.

BRIEF DESCRIPTION OF THE DRAWINGS

These and other features and advantages of the present invention will be better understood by reading the following detailed description, taken together with the drawings wherein:

FIG. 6—Shows the Voter Receipt with the unidentified hash total at the bottom left corner, followed by the unidentified four random digits.

FIG. 7—Shows the Election Report with all recorded votes.

FIG. 8—Shows the summary report with all page totals of the Election Report.

FIG. 9—Shows the Election Error Report of any votes recorded during off hours.

FIG. 10—Shows the Election Error Report of any votes with hash total discrepancies. It is important to note that both Error Reports will be printed even if there are no errors to report.

DETAILED DESCRIPTION OF THE PREFERRED EMBODIMENTS OF THE INVENTION

Figure 1:
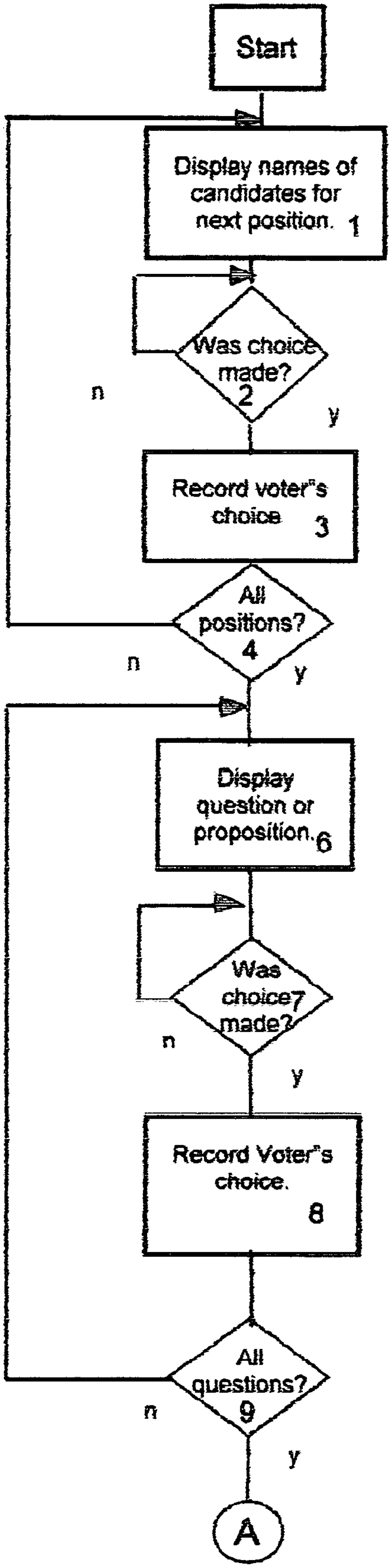
Figure 1 PRIOR ART
FIG. 1—Displays the logic used to record votes in the computer. The candidates for each position are displayed so the voter can make a choice. After all candidates are displayed, the questions or referendums are presented, one at a time, for the voter to select "yes" or "no".

The steps of the most preferred method of the invention, involving most of the disclosed features for deterring voter fraud, are as follows for each individual voter, except for step (b):

(a) recording a set of individual ballot choices of a voter along with a voter identification number;

(b) providing a group of hash numbers, one hash number to be assigned for each possible potential voter choice that can exist for a substantial number of voter ballots;

(c) assigning hash numbers to each individual ballot choice made by a particular voter and recording in said data processor a particular composite hash value for the particular voter that is a function of and indicates the voter's set of choices;

(d) enabling issuance of a receipt to the particular voter bearing the voter identification number along with the composite hash value;

(e) enabling submission of the receipt upon voter request to an administrator for challenging authenticity of the voter's choices recorded on the receipt and upon submission of the receipt, causing the data processor to compare a particular retrieved composite hash value recorded on the receipt with a previously recorded particular composite hash value associated with the voter identification number;

(f) registering a mismatch, in a forged receipt register, between the particular retrieved composite hash value recorded on the receipt with the previously recorded particular composite hash value associated with the voter identification number, such mismatch indicating a compromised vote.

Optionally a voter identification number can be a meaningless random number or could be an ordinary digit encrypted in various ways to enhance voter privacy from others such as snoopy neighbors. The voter receipt can be automatically issued after a vote is registered or can be issued upon voter request by a printer at the polling station, or over the internet, in response to the voter entering his confidential voter identification number.

Thus, the favorable matching of the composite hash value printed on the voter's receipt with the previously recorded composite hash value, associated with the voter's ID number within the data processor, indicates the authenticity of the printed receipt. This deters the voter from asserting that the printed choices on the receipt are not correct. On the other hand, an unfavorable matching would indicate that the hash value on the receipt was a forgery. Note that a person attempting to practice such forgeries would not know how to determine the correct hash value for a forged set of voter choices. This is because the hash value algorithm for encoding the hash values and the composite hash value are secret. Any types of codes, other than specific types of hash values, may be employed to encode, define or establish the voters recorded choices at the polls.

Besides the above method of deterring voter induced fraud, fraud may involve internal tampering of the correctly recorded votes by a hacker or other person gaining access to the internal workings of the data processor. The composite hatch values may also be employed in this connection also by causing the data processor, preferably at the closing of the polls, or from time to time when the polls are open, by executing the following steps.

The data processor examines or sequentially scans each set of previously recorded individual ballot choices of groups of voters and re-computes particular composite hash values for each such set of previously recorded individual ballot choices to produce re-computed particular composite hash values and compares the re-computed particular composite hash values with previously recorded particular composite hash values and records mismatches between them in an internally compromised vote register, indicating internal tampering of data within the data processor.

Internal tampering may also involve entering fraudulent votes after the closing of the polls. This process can be described as stuffing of ballot boxes and can be deterred by causing the data processor to enter any and all time-stamped after-hours ballot choices into an invalid vote time-of-vote register. This feature can further aid in deterring fraud in the election process. The time stamp is preferably encrypted by a secret algorithm to further deter a hacker from using a false time-stamp value that is within the polling hours.

It may now be appreciated that the methods of the invention tend to provide great assurance, to the voter as well as others, that every vote has been counted and is in fact included in the total reported for the precinct. A unique voter ID number is assigned to each voter and printed on each voter's receipt so that the voter, or the voter's representative, can later verify that the vote is included in the totals reported. To do this, each precinct has the capability to produce a listing of votes and make the listing available to the voting public for easy verification of individual votes. Even if only a few people verify their votes, the mere capability is a strong assurance of authenticity of the voting process to the general public.

Importantly, the invention provides listings of votes that do not meet certain criteria, such as, votes that were cast at other than official poll times or votes that have inconsistent hash totals indicating an unexpected modification might have been made internally to a particular vote. The invention provides a complete listing of all votes and all the information necessary to investigate suspicious votes so the election officials can delete any votes they have judged to be illegal. Finally, the invention provides the necessary documentation to report all discrepancies (voter complaints) so that election officials, and the general public can be assured that all complaints were investigated and properly disposed of.

The following description of the flow charts and other figures are presented for further clarification of the preferred voting process executed by the data processor.

In FIG. 1:

Step 1: The names of candidates for each position are displayed on the screen, one position at a time, so the voter can make a selection. The voter selects his choice by touching the screen on the "touch button" opposite the candidate's name.

Step 2. The program waits for the voter to make a choice before going to the next position.

Step 3. When the voter makes a selection, the vote for that candidate is recorded in a temporary workspace in memory.

Step 4. When votes for all positions in the election have been recorded, the program continues with questions or propositions in the election.

Step 6. Each question or proposition is displayed, one at a time, on the screen with an appropriate "touch button" to record the vote.

Step 7. The program waits for the voter to make a choice before going to the next question on the ballot.

Step 8. When the voter makes a selection, the vote is recorded in a temporary workspace in memory.

Step 9. When votes for all questions have been recorded, the program continues to Step 11.

Figure 2:
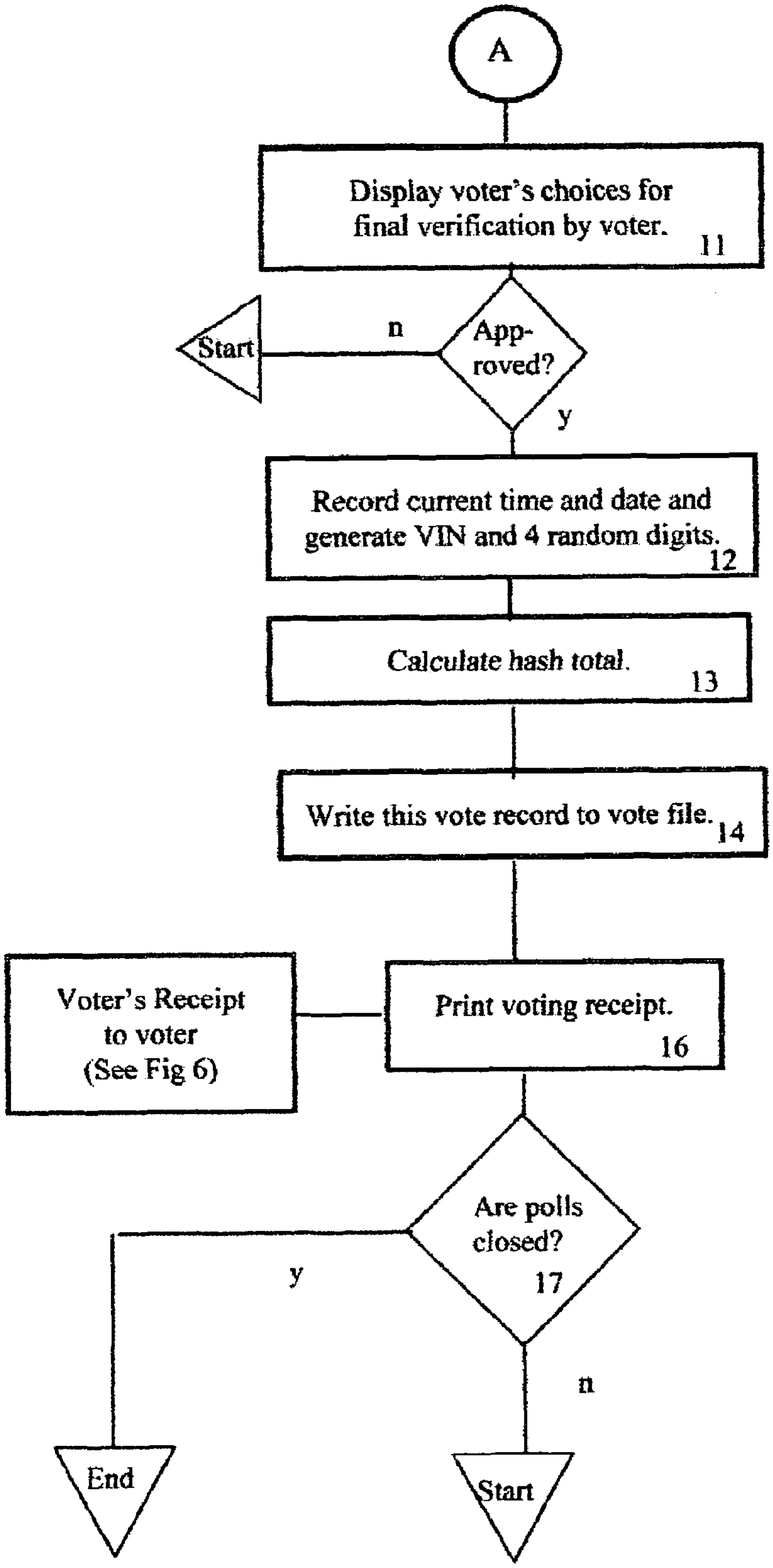
FIG. 2—The voter is presented with all his choices for a final verification of the vote. Once verified, the vote is recorded internally on the file of voting records, votes are added to the selected candidates totals, and the date and time of verification are also noted on the voting record. The hash total, corresponding to the selections made by the voter and the methodology defined by the election administrator is recorded on the vote record. Finally, the VIN (Voter Identification Number) and four random digits from 1 to 9 are generated and included in the vote record. A voting receipt is printed and made available to the voter.

In FIG. 2:

Step 11. The screen displays all votes made by this voter along with two touch buttons to allow the voter to either approve or disapprove the entire vote. If the voter disapproves, the votes recorded in the temporary workspace are cleared and the program goes back to the beginning to record each of his votes again. If the voter approves, the program proceeds to Step 12.

Step 12. The current time and date are recorded in the temporary workspace. The Voter Identification Number (VIN) for this voter is generated as well as four random digits that are explained below.

Step 13. The hash total is calculated according to an algorithm defined by the administrator or Registrar before the election date, preferably by totaling the values assigned to each candidate and each question and applying one or more of the random digits as multipliers or addendums to the hash total. Such totaling of the hash numbers is thus a function of the voter's choices, and defines the set of his particular choices.

Step 14. The voter's record is written to the voting file.

Step 16. The voting receipt is printed for the voter. See FIG. 6.

Step 17. The program ends when the polls close.

Figure 3:
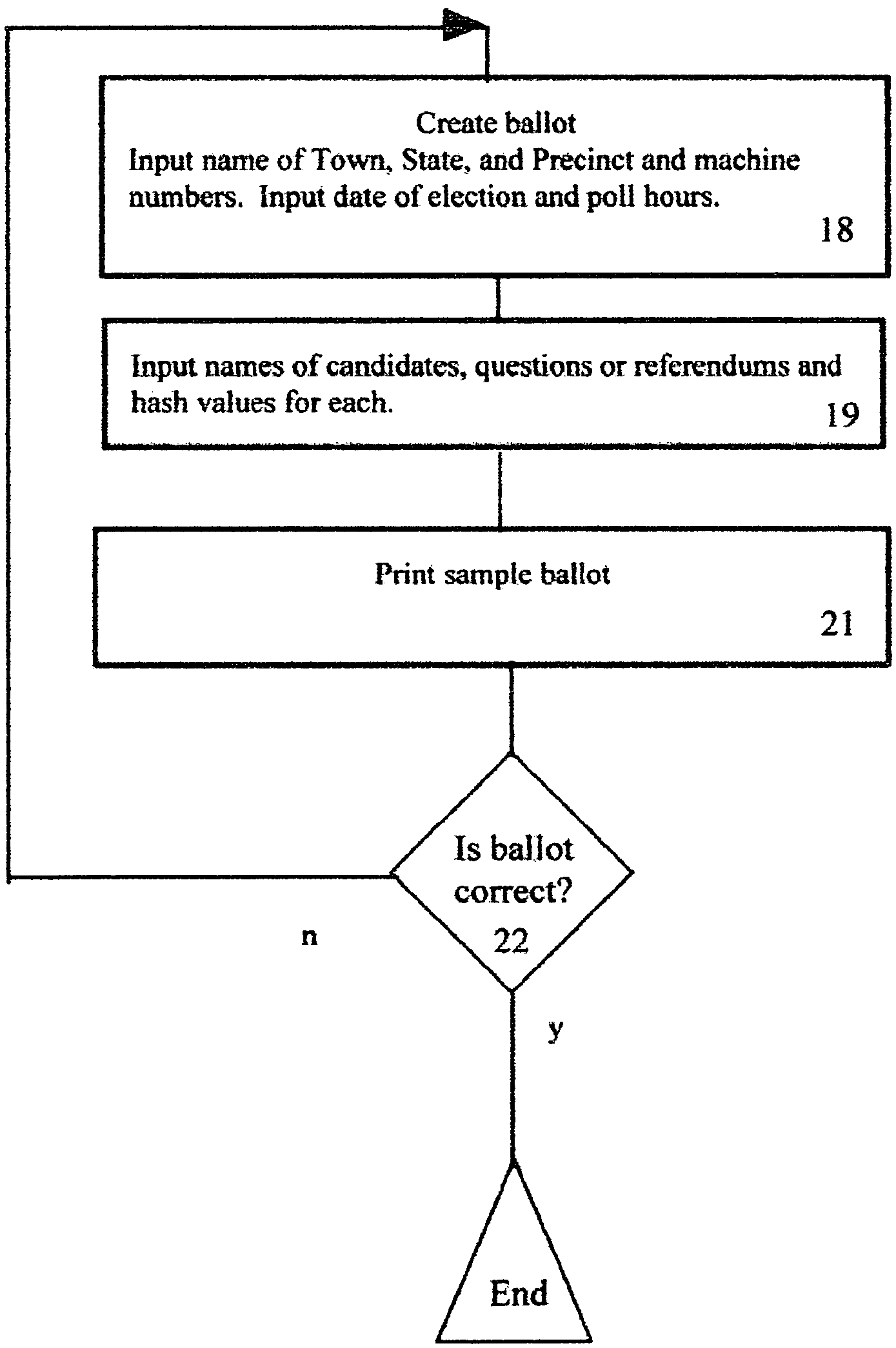
FIG. 3—Displays the logic of a simple program used by the election administrator to create the ballot and set the perimeters for the election. Provision is made to print sample ballots for administrative purposes.

In FIG. 3:

Step 18. Before the election, the administrator creates the ballot by inserting the names of the Town and State and the Precinct and machine numbers, the date of the election and the hours the polls are open.

Step 19. The administrator continues with information on all positions, candidates, questions or referendums in the election. At this time the administrator inputs hash values for each candidate and each "yes" or "no" answer. He also defines which of the random numbers are to be used in calculating the hash totals, and how each will be used. This information should be kept confidential.

Step 21. A sample ballot is printed to ensure accuracy and for informational and administrative use.

Step 22: If the sample ballot is inaccurate, the process is repeated from Step 18. If the sample ballot is satisfactory, the program ends. The ballot has been created.

Figure 4:
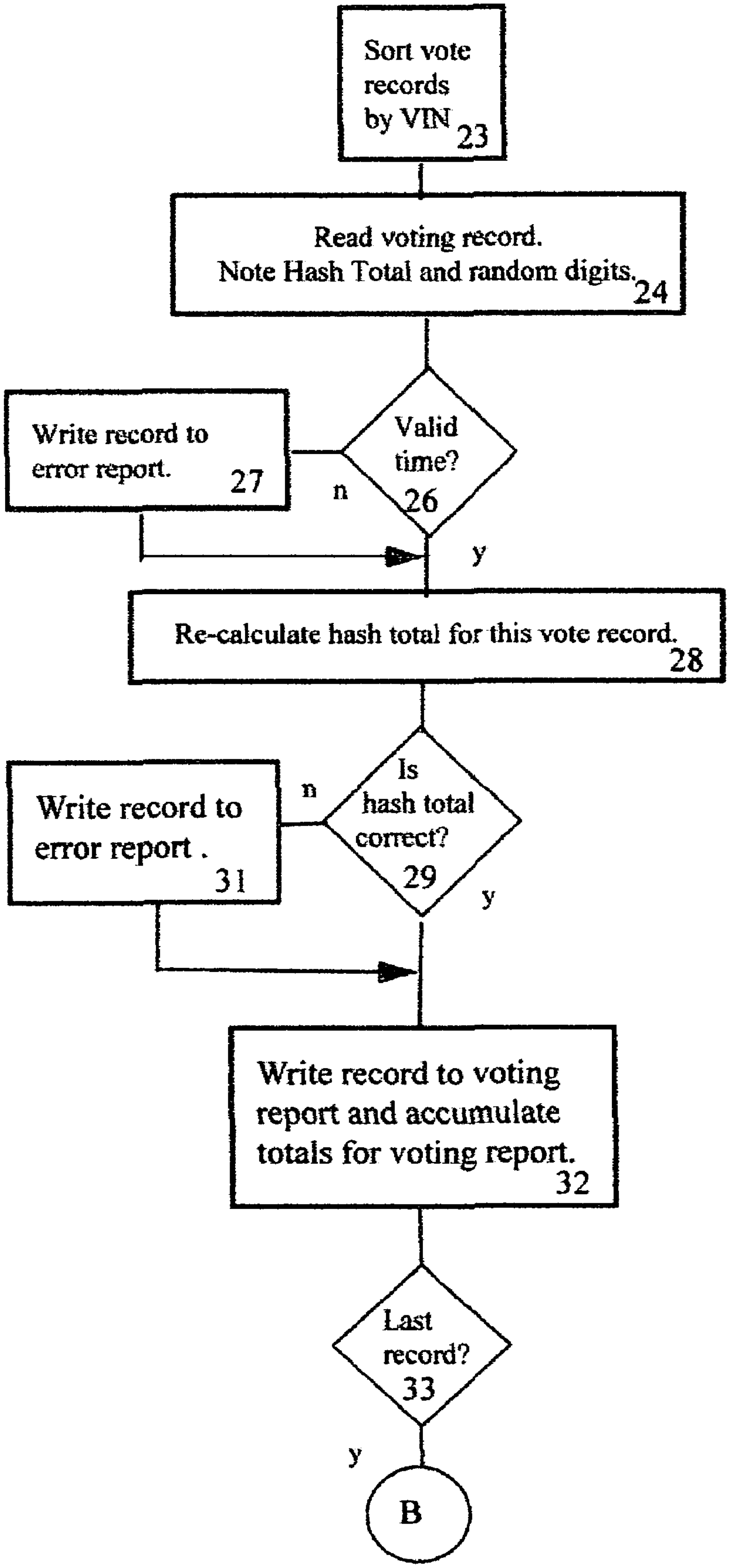
FIG. 4—Displays the processing after the polls are closed. The voting records are sorted in order by VIN number. First, each record is read and used to accumulate vote totals for all candidates and all referendums. Any vote recorded at other than valid poll hours is written to an error file and totals for that file are accumulated. Next, the hash total is recalculated according to the same criteria used in the voting procedure. If the recalculated hash total does not agree with the original hash total, the record is written to another error file and vote totals for this file are accumulated.

In FIG. 4:

Step 23. After the polls close, the voter records are processed by sorting them in ascending order by VIN.

Step 24. Each record is read. The voter's selections, the hash total, date, and time the vote was recorded, and the random digits are stored in a temporary workspace in memory.

Step 26. Verify the vote was recorded during the official polling hours by comparing the date and time the vote was recorded to the date and time the polls were officially open.

Step 27. If the vote was recorded at other than official polling hours, write the VIN and the date and time the vote was recorded to an error report. See FIG. 9. Proceed to Step 28.

Step 28. Re-calculate the hash total for this vote using the same algorithm used to record the vote.

Step 29. Verify the hash total agrees with the total taken at the time of the vote.

Step 31. If the hash totals do not agree, the VIN and both hash totals are written to an error report. See FIG. 10. Proceed to Step 32.

Step 32. The selections from the voting record are added to the accumulators for each candidate and for each question or proposition.

Step 33. The procedure continues for the next record, until all records have been processed.

Figure 5:
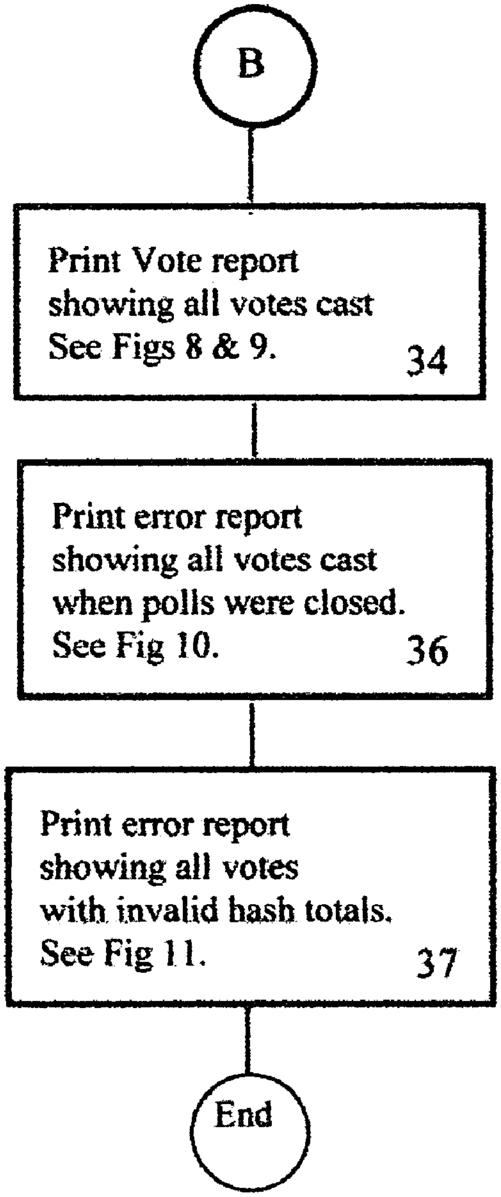
FIG. 5—Shows the voting reports that are printed as a result of the election.

In FIG. 5:

Step 34. The vote report is printed showing all details of each vote as well as page and grand totals. See FIGS. 7 & 8.

Step 36. An error report is printed showing the VIN for each vote that was recorded during a time when the polls were closed. It is expected that under usual circumstances there will be no VINs reported here. In that case, the report will be printed with the normal headings but will only contain the words "None reported." See FIG. 9.

Step 37. An error report is printed showing the VIN for each vote with invalid hash totals. It is expected under normal circumstances to have no VINs reported here. In that case, the report will be printed with the normal headings but will only contain the words "None reported." See FIG. 10.

FIG. 6 shows an exemplary Voter Receipt with the unidentified hash total at the bottom left corner, followed by the unidentified four random digits.

FIG. 7 shows an exemplary Election Report with all recorded votes.

FIG. 8 shows an exemplary summary report with all page totals of the Election Report.

FIG. 9 shows an exemplary Election Error Report of any votes recorded during off hours.

FIG. 10 shows the Election Error Report of any votes with hash total discrepancies. It is important to note that both Error Reports will be printed even if there are no errors to report.

Regarding hash totals the Registrar of Voters or Election Administrator is responsible for assigning confidential, individual, and unique values to each candidate and to each "yes" or "no" answer. These values are totaled for each vote and further modified by the Random Digits as described below. The modified total is recorded internally on the voting record and printed on the voter's receipt in the bottom left corner. It can be any number of digits, depending on the methodology used to generate it. The purpose of hash totals is to readily identify any fraudulent voter's receipts presented as complaints.

Regarding random digits they are generated for each vote and are recorded internally on the voting record as well as on the voter's receipt in the bottom left corner, following the hash total. One or more of the digits are used as multipliers or as additions to the hash total to modify the hash totals of each vote. The exact methodology is consistent for all votes in the election but is varied for subsequent elections. The purpose is to avoid a situation in elections with only one or two questions where the hash totals for each selection are readily apparent or can be easily ascertained.

Regarding the voter identification number a seven-digit number is preferred in the following format:

The first two digits identify the voting machine in that particular precinct.

The third and fourth digits are a sequential number from 01 to 99.

The fifth, sixth, and seventh digits are a random number from 001 to 999. The program contains a table of three-digit random numbers that are assigned as each vote is registered. When all 999 numbers in the table are used, the number represented by the third and fourth digits is increased by one and the table is set to assign numbers once again from the beginning.

This methodology is used to avoid assigning VINs in sequential order and therefore possibly compromising voter privacy.

Since variations and modifications of the specification described will occur to those skilled in the art, the scope of the invention is to be limited solely to the terms of the claims and equivalents thereto. For example, while hash numbers, hash values, and hash totals are the preferred enciphering devices or codes, the claimed invention is intended to cover any codes used for scrambling or encryption.

What is claimed is:

1. A method of utilizing a data processor to produce a voting record comprising the steps of:

(a) recording a set of individual ballot choices of a voter along with a voter identification number;

(b) providing a group of code numbers, one code number to be assigned for each possible potential voter choice that can exist for a substantial number of voter ballots;

(c) assigning code numbers to each individual ballot choice made by a particular voter and recording in said data processor a particular composite code value for said particular voter that is a function of and indicates the voter's set of choices;

(d) enabling issuance of a receipt to said particular voter bearing said voter identification number along with said composite code value;

(e) enabling submission of said receipt upon voter request to an administrator for challenging authenticity of said voter's choices recorded on said receipt and upon submission of the receipt, causing the data processor to compare a particular retrieved composite code value recorded on said receipt with a previously recorded particular composite code value associated with said voter identification number in accordance with step (c);

(f) registering a mismatch between the particular retrieved composite code value recorded on the receipt with the previously recorded particular composite code value associated with said voter identification number compared in accordance with step (e), indicating a compromised vote; and (g) repeating steps (a) and (c)–(f) for each individual voter.

2. The method of claim 1 including the step of causing said data processor to record in a forged receipt register that one or more voter choices on said receipt are forgeries upon an unfavorable comparison of a particular retrieved composite code value on said receipt with a previously recorded particular code value of said particular voter associated with said voter identification number.

3. The method of claim 1 wherein said voter identification number is encrypted to enhance voter privacy.

4. The method of claim 2 wherein said voter identification number is encrypted to enhance voter privacy.

5. The method of claim 1 wherein said particular code value recorded in accordance with step (c) is encrypted by a random number.

6. The method of claim 2 wherein said particular code value recorded in accordance with step (c) is encrypted by a random number.

7. The method of claim 3 wherein said particular code value recorded in accordance with step (c) is encrypted by a random number.

8. The method of claim 1 including the step of enabling production of a printout of all votes in a precinct, and wherein data on said receipt is included in said printout, said printout having page totals summarized at the end of the printout, enabling the voter to easily ascertain that his vote was included in the totals reported by his precinct.

9. The method of claim 1 wherein said receipt, issued in accordance with step (d), is issued upon voter request.

10. The method of claim 1 including:

(h) scanning each set of previously recorded individual ballot choices of groups of voters and re-computing particular composite code values for each set of previously recorded individual ballot choices to produce recomputed particular composite code values; and (i) comparing said recomputed particular composite code values with previously recorded particular composite code values in accordance with step (c) and recording mismatches therebetween in an internally compromised vote register, indicating internal tampering of data within said data processor.

11. The method of claim 2 including:

(i) examining each set of previously recorded individual ballot choices of groups of voters and re-computing particular composite code values for each set of previously recorded individual ballot choices to produce recomputed particular composite code values; and (j) comparing said recomputed particular composite code values with previously recorded particular composite code values in accordance with step (c) and recording mismatches therebetween in an internally compromised vote register, indicating internal tampering of data within said data processor.

12. The method of claim 1 including the step of entering time-stamped after-hours previously recorded ballot choices recorded in step (a) into an invalid vote time-of-vote register.

13. The method of claim 2 including the step of entering time-stamped after-hours previously recorded ballot choices recorded in step (a) into an invalid vote time-of-vote register.

14. The method of claim 10 including the step of entering time-stamped after-hours previously recorded ballot choices recorded in step (a) into an invalid vote time-of-vote register.

15. The method of claim 11 including the step of entering time-stamped after-hours previously recorded ballot choices recorded in step (a) into an invalid vote time-of-vote register.

16. A method of utilizing a data processor to produce voting records comprising the steps of:

(a) recording a set of individual ballot choices, along with a voter identification number, for each voter;

(b) providing a group of code numbers, one code number to be assigned for each possible potential voter choice that can exist for a substantial number of voter ballots;

(c) assigning code numbers to each individual ballot choice made by a particular voter and recording in said data processor a particular composite code value for said particular voter that is a function of and indicates the voter's set of choices;

(d) examining each set of previously recorded individual ballot choices of groups of voters and re-computing particular composite code values for each set of previously recorded individual ballot choices to produce recomputed particular composite code values; and (e) comparing said recomputed particular composite code values with previously recorded particular composite code values and recording mismatches therebetween in a compromised vote register, indicating internal tampering of data within said data processor.

17. The method of claim 16 including the step of entering time-stamped after-hours previously recorded ballot choices recorded in step (a) into an invalid vote time-of-vote register.

18. A method of utilizing a data processor to produce voting records comprising the steps of:

(a) recording a set of individual ballot choices, along with a voter identification number for each voter, in said data processor and on a voter receipt;

(b) providing a group of code numbers, one code number to be assigned for each possible potential voter choice on a ballot;

(c) causing said data processor to assign a code number, in said group of code numbers, to each individual ballot choice made by a particular voter and producing a particular composite code value for said particular voter that is a function of and indicates the voter's set of choices; and (d) recording said particular composite code value upon a voter receipt for verification of the authenticity of said receipt.

19. The method of claim 18 wherein said voter identification number is encrypted to enhance voter privacy.

20. The method of claim 18 including the step of recording an encrypted time-stamp upon said voter receipt.

* * * * *